United States Patent [19]
Lee

[11] Patent Number: 6,005,998
[45] Date of Patent: Dec. 21, 1999

[54] STRICTLY NON-BLOCKING SCALABLE MATRIX OPTICAL SWITCH

[75] Inventor: Byung H. Lee, Holmdel, N.J.

[73] Assignee: Lucent Technologies Inc., Murray Hill, N.J.

[21] Appl. No.: 09/026,856

[22] Filed: Feb. 20, 1998

[51] Int. Cl.$^6$ ............................................. G02B 6/20
[52] U.S. Cl. ........................ 385/33; 385/25; 385/20; 385/21
[58] Field of Search ........................ 385/20–23, 33, 385/34, 35, 25

[56] References Cited

U.S. PATENT DOCUMENTS

| | | | |
|---|---|---|---|
| 5,206,497 | 4/1993 | Lee | 250/201.1 |
| 5,208,888 | 5/1993 | Steinblatt et al. | 385/90 |
| 5,642,446 | 6/1997 | Tsai | 385/16 |

Primary Examiner—Hung N. Ngo

[57] ABSTRACT

A scalable, non-blocking fiber optic matrix switch has two arrays of light beam collimators arranged to face one another in free space, and a number of optical fibers coupled to each of the arrays. Each collimator has a tubular body with a fiber receiving part at one end, and a lens mounting part at an opposite end of the body. A lens fixed in the mounting part produces a collimated light beam from light emitted from an end of an optical fiber inserted in the fiber receiving part. First and second motor assemblies with corresponding positioning elements displace the collimator body so that its light beam is steered to a desired position along "X" and "Y" axes in response to operation of the motor assemblies. A signal carried on a fiber entering a first collimator in one array can be switched into a fiber of a second collimator in the opposite array, by displacing the collimators so as to direct the beam of the first collimator to align with a lens axis of the second. For an N×N matrix switch, N collimators are used at each array, and up to N optical signals can be cross-connected without blocking.

13 Claims, 9 Drawing Sheets

STRICTLY NON-BLOCKING SCALABLE MATRIX OPTICAL SWITCH

BACKGROUND OF THE INVENTION

1. Field of the Invention

The present invention relates to optical switches, and particularly to a scalable matrix optical switch arrangement.

2. Discussion of the Known Art

U.S. Pat. No. 5,206,497 (Apr. 27, 1993) discloses free-space optical switching apparatus. A light beam-carrying optical fiber is coupled to a collimated beam launcher, and the trajectory of the beam in space is adjusted by a servo-controlled motor driven positioning mechanism. The beam is steered by the adjusting mechanism toward a selected one of a number of photo receptors each of which has a corresponding optical fiber leading from the receptor. A component of the free-space beam is split by a mirror and reflected toward an area sensor. An output of the sensor is applied to a processor/controller which, in turn, controls the trajectory adjusting mechanism to insure that the beam remains incident on a selected photoreceptor.

Applications exist wherein numerous light-modulated signals carried by respective optical fibers must be switched for routing among a corresponding number of output fibers, within relatively short switching times and without significant cross-talk among the fibers. Known guided wave matrix switch arrangements operate by directing light beams inside crystalline blocks. These arrangements are not entirely satisfactory in that they are sensitive to the state of polarization (SOP) of the light beams. Each element of the switch exhibits an insertion loss of around 1½ dB, and they produce 20 dB cross-talk at best. Also, the number of optical elements needed to realize an N-input by N-output optical guided wave switch, is on the order of $2N*\log_2 N$ to $N^2$ elements depending on the switch architecture. For a large scale, e.g., 4096×4096 matrix switch, a crystalline guided wave optical switch arrangement does not provide a practical solution.

SUMMARY OF THE INVENTION

According to the invention, a fiber optic light beam collimator has a generally tubular body with a fiber receiving part at one end, and a lens mounting part at an opposite end of the body. A lens fixed in the mounting part produces a collimated light beam from light emitted from an end of an optical fiber inserted in the fiber receiving part. First and second motor assemblies with corresponding positioning elements displace the collimator body so that its light beam is steered to a desired position along first and second axes in response to operation of the motor assemblies.

According to another aspect of the invention, a non-blocking fiber optic switch has two arrays of light beam collimators arranged to face one another in free space, and a number of optical fibers coupled to each of the arrays. Each collimator has a generally tubular body with a fiber receiving part at one end, and a lens mounting part at an opposite end of the body. A lens fixed in the mounting part produces a collimated light beam from light emitted from an end of an optical fiber inserted in the fiber receiving part. First and second motor assemblies with corresponding positioning elements displace the collimator body so that its light beam is steered to a desired position along first and second axes in response to operation of the motor assemblies. A signal carried on a fiber entering a first collimator of one array can be switched into a fiber of a second collimator of the opposite array, by displacing the first collimator so as to steer its beam to impinge on the face of the second collimator.

For a better understanding of the invention, reference is made to the following description taken in conjunction with the accompanying drawing, and the appended claims.

DETAILED DESCRIPTION OF THE INVENTION

Figure 1:
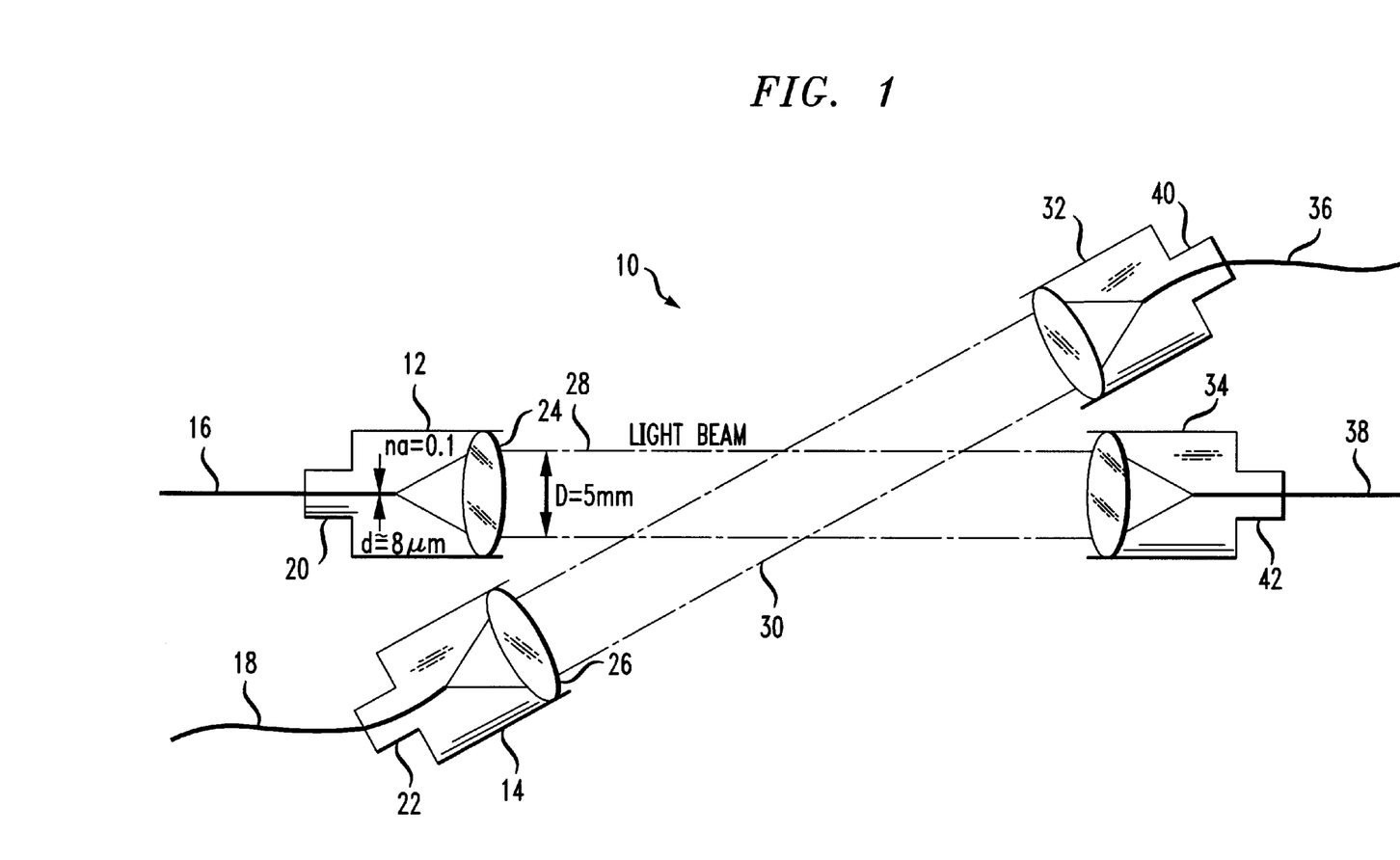
FIG. 1 is a schematic diagram of a light beam switching configuration on which the invention is based.
Figure 2:
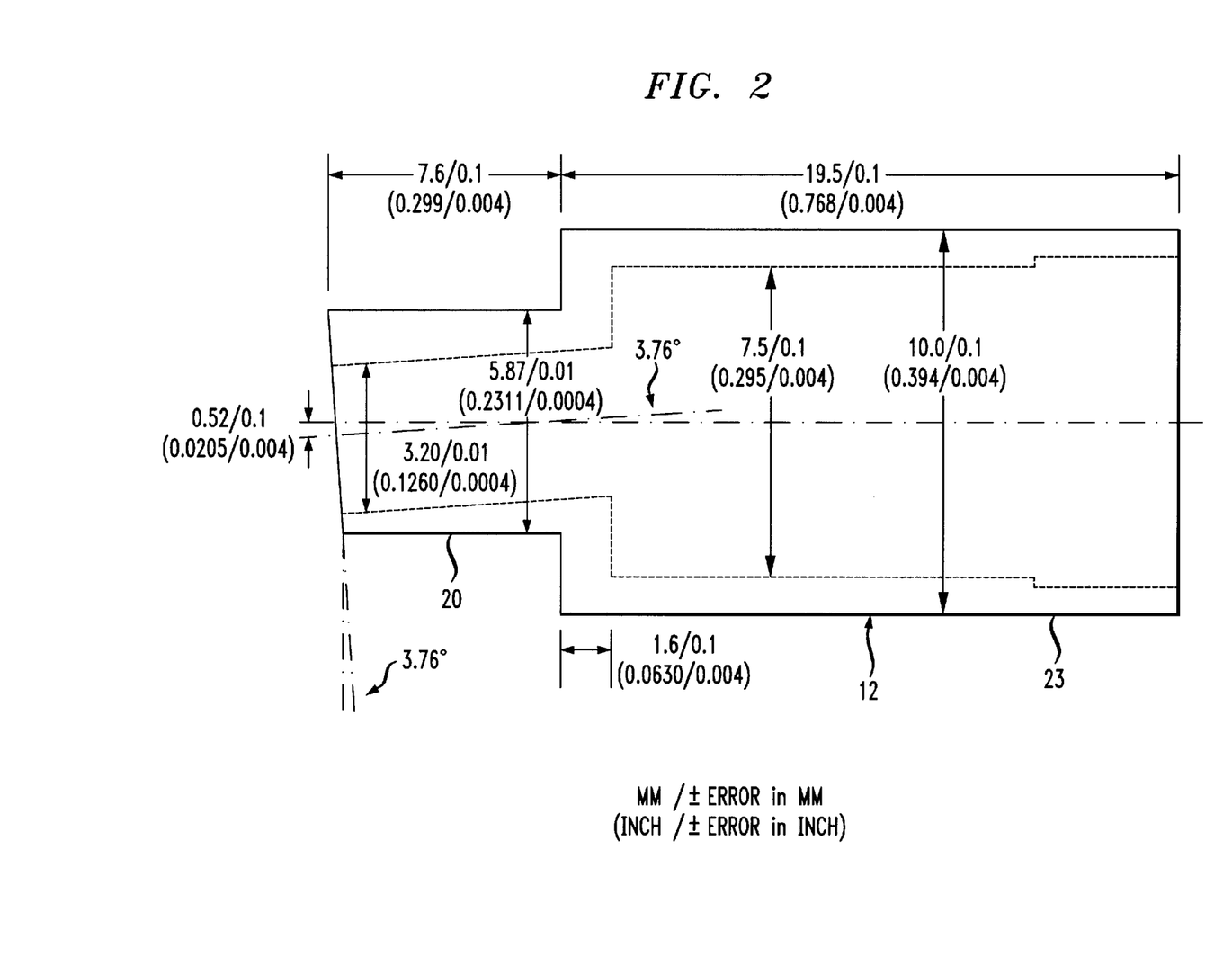
FIG. 2 is a diagram showing a configuration of a collimator housing according to the invention.

FIG. 1 is a schematic representation of a strictly non-blocking, multiple light beam transmission configuration 10 on which the invention is based. Each of two light beam collimators 12, 14 at the left in FIG. 1, has a corresponding single mode optical fiber 16, 18 leading into a fiber receiving part 20, 22 of the body of the respective collimator 12, 14. FIG. 2 shows the configuration of the body of collimator 12, including the fiber receiving part 20 and a lens mounting part 23. Preferably, the axis of the fiber receiving part 20 is inclined with respect to the axis of the lens mounting part, by such an amount (e.g., 3.76 degrees) that light emitted from a cut end of the fiber 16 (see FIG. 4 and related description) has a direction substantially coincident with the axis of the lens mounting part 23.

Each collimator also has an aspheric lens 24, 26 fixed at a determined focal length distance from an end of the corresponding fiber 16, 18, for producing a collimated light beam 28, 30, as shown in FIG. 1. Although the light beams 28, 30 may intersect one another, information carried on either beam remains substantially unaffected by the other beam. That is, cross-talk of information carried by one beam onto the other beam is insubstantial, as currently known in the art.

Light beam collimators 32, 34 at the right in FIG. 1 are aligned to respond to corresponding ones of the light beams 28, 30 emitted by the left collimators 12, 14. The right collimators 32, 34 have corresponding single mode optical fibers 36, 38 leading from fiber receiving parts 40, 42 of the collimators.

Figure 3:
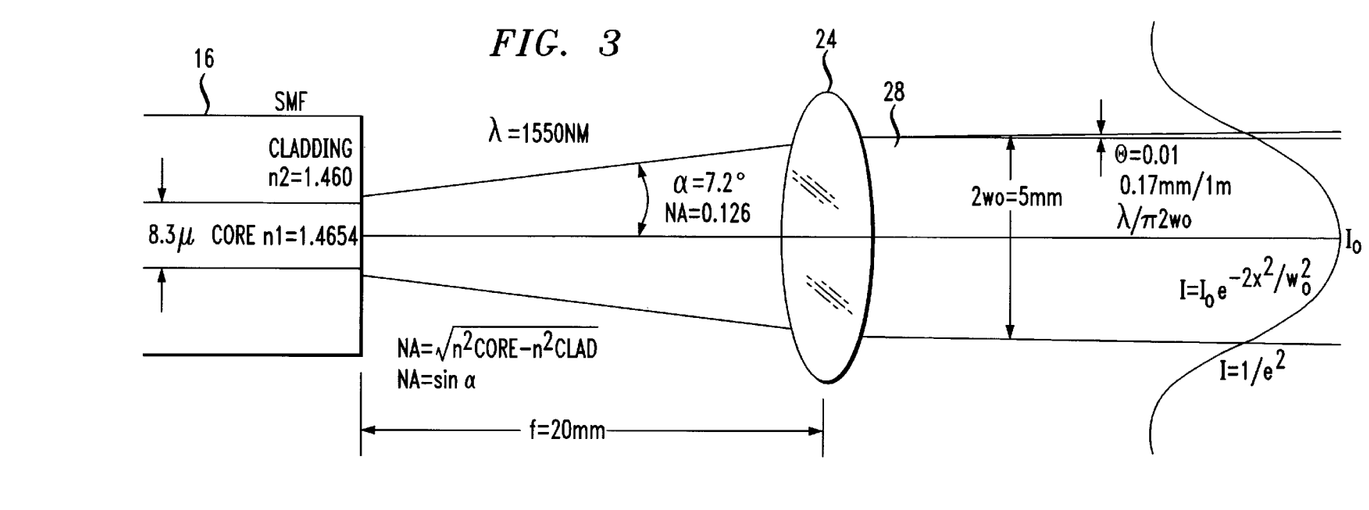
FIG. 3 is an optical diagram showing a light path in the collimator of FIG. 2
Figure 4:
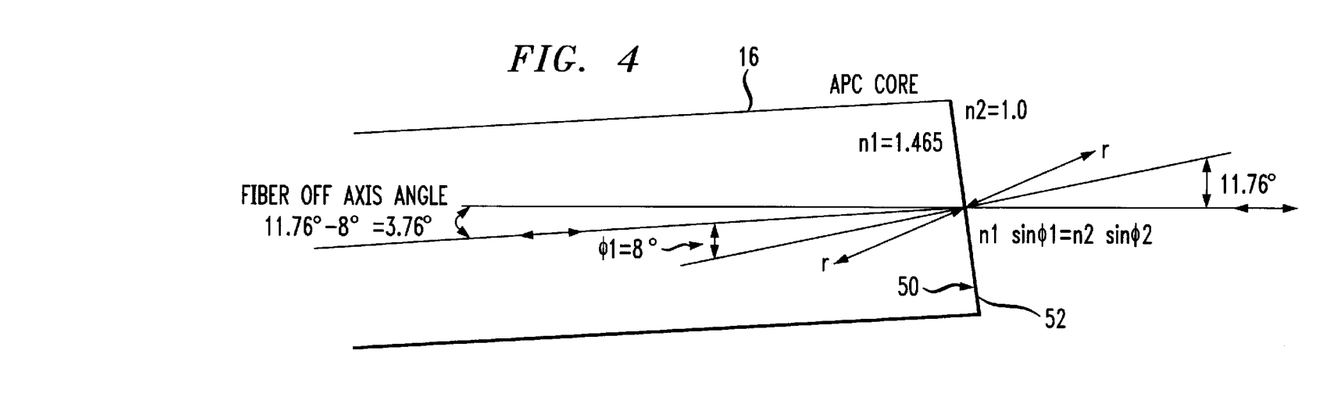
FIG. 4 is an optical diagram showing a relative inclination of an axis of a fiber inserted in the collimator of FIG. 2.

FIG. 3 is an optical diagram showing a light path from an end of one of the fibers, e.g., fiber 16 in the collimator 12. In the disclosed embodiment, all light fibers are single mode fibers having, e.g., a core diameter of 8.3 microns and an index of refraction $n_1=1.4654$. The fibers have a cladding with index of refraction $n_2=1.460$. Each collimator lens (e.g., lens 24) is positioned at a focal length f=20 mm from the fiber end. As shown in FIG. 4, the fiber ends are preferably cut to form an end surface 50 whose normal direction is at an angle of 8° with respect to the axis of the fiber, to prevent reflections at the fiber/air boundary from being directed back along the axis of the fiber 16. The end surface 50 preferably has an anti-reflective coating 52.

The light beam 28 emitted from collimator lens 24 preferably has a gaussian profile, and a relatively small divergence angle. These beam characteristics allow the present optical switch to achieve insertion losses of less than 1 dB, and to be vibration tolerant. Further, the relatively large gaussian beam 28 is easy to aim by adjusting the position of its collimator, as described further below.

Figure 5:
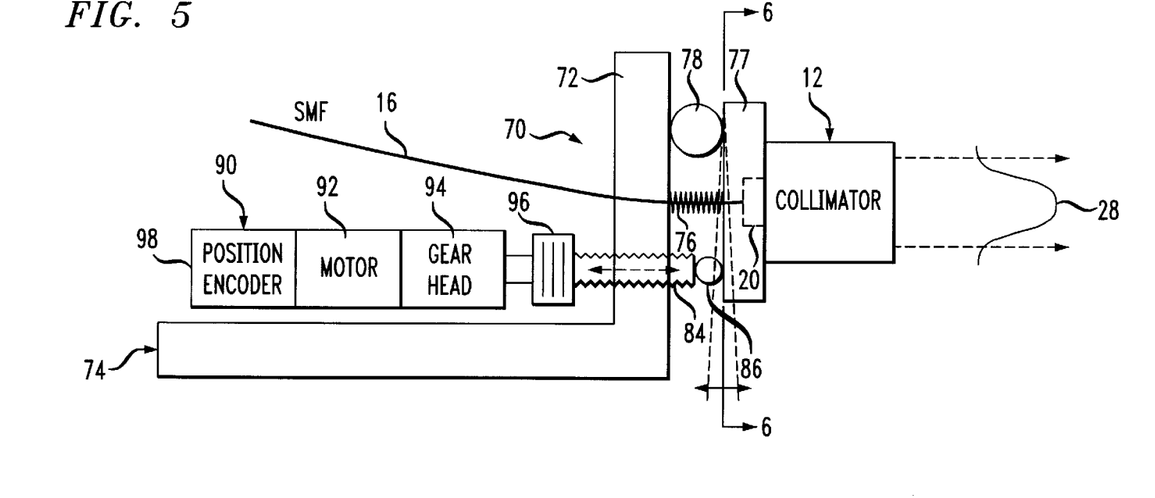
FIG. 5 is a side view, in elevation, of a collimator adjustment mechanism according to the invention.

FIG. 5 is a representation of a collimator adjustment mechanism 70, according to the invention. Each collimator, e.g., collimator 12 in FIG. 1, is secured to a front wall 72 of a frame 74. A tension spring 76 is fixed at its ends to the frame wall 72, and to a collimator back wall 77 in which the fiber receiving part 20 of the collimator 12 is fixed. A ball bearing 78 is seated between the collimator back wall 77 and the frame front wall 72.

Figure 6:
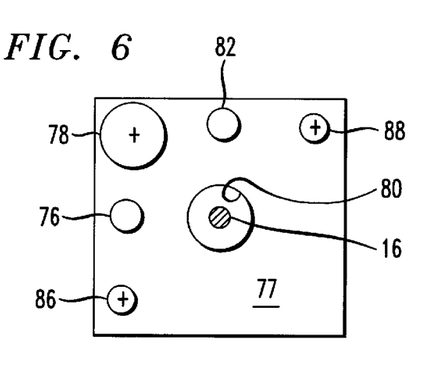
FIG. 6 is an elevation view showing a back wall of a collimator mounting bracket in FIG. 5.

FIG. 6 is an elevation view looking toward the collimator back wall 77 from the left side of FIG. 5. The light fiber 16 enters the collimator 12 through a mounting hole 80 in the back wall 77. A second tension spring 82 (not visible in FIG. 5) is sandwiched between the collimator wall 77 and the frame wall 72. A "Y" position deflecting lead screw 84 projects through an opening in the frame wall 72 to confront a bottom left corner of the collimator wall 77 as seen in FIG. 6, through a round bearing 86. An "X" position deflecting lead screw 88 (not seen in FIG. 5) projects through an opening in the frame wall 72 to confront an upper right corner of the collimator back wall 77 in FIG. 6, through a round bearing 88. The ball bearing 78 is seated at the upper left corner of the collimator back wall 77. Spring 76 is fixed intermediate the bearing 78 and the Y lead screw 86, and spring 82 is fixed intermediate the bearing 78 and the X lead screw 88.

A first, Y motor assembly 90 shown in FIG. 5 operates to advance or to retract a distal end of the lead screw 84 with respect to the collimator wall 77, and, thus, to deflect the collimator 12 and its payload light beam 28 to a desired angle in elevation (Y direction) with respect to the orientation in FIG. 5. A second, X motor assembly (not shown in FIG. 5) operates to drive the X deflection lead screw 88, and, thus, to swivel the collimator 12 and its beam 28 to a desired angle in azimuth (X direction) with respect to the orientation in FIG. 5.

Each motor assembly, e.g., the assembly 90 in FIG. 5, comprises a motor 92, for example, a DC servo motor, a drive shaft of which is coupled to a gear head 94. The gear head 94 operates to provide a gear reduction ratio of, for example, 64:1 to the motor shaft, and to transmit the reduced rotational motion to a flexible coupling 94. The coupling 94 preferably has no measurable backlash and may be in the form of a bellows or equivalent axially elastic coupling, i.e., a coupling flexible in the axial direction only. An output end of the coupling 94 is fixed to a proximal end of the lead screw 84. In a preferred embodiment, both the X and the Y lead screws are pitched at a rate of 80 threads or pitches per inch (PPI), and total axial movement of the screw is set at +/−0.05" over eight full turns. The maximum deflection angle obtained via the lead screw 84 for the collimator beam 28 along each axis of deflection, is typically +/−8.45 or 16.9 degrees.

The drive shaft of motor 92 is also coupled to a position encoder 98. The encoder 98 has a resolution of, e.g., 40 counts per revolution (CPR). Since the reduction ratio of the gear head 94 is 64:1, and total axial movement for the lead screw occurs with eight screw turns, the total resolution obtained with the encoder 98 is 40×64×8=20,480.

Figure 7:
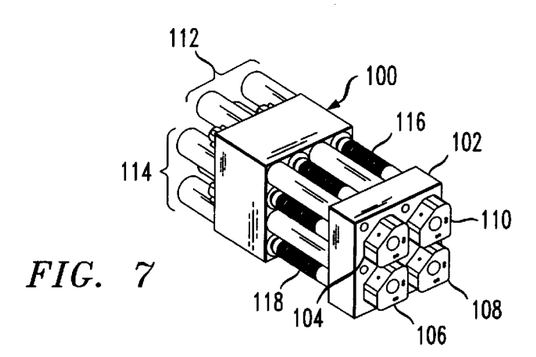
FIG. 7 is a perspective view of a beam deflection cluster according to the invention.

FIG. 7 is a view of a beam deflection cluster 100 according to the invention. In a preferred embodiment, the cluster 100 is a building "block" of a matrix optical switch assembly according to the invention. A frame front wall 102 of the cluster 100 confronts four collimators 104, 106, 108, and 110 arranged squarely two-by-two. Each collimator is joined to the frame wall 102 via two springs (not visible in FIG. 7), similar to springs 76, 82 in FIG. 5. Further, each collimator of the cluster 100 has an associated ball bearing situated similarly to the ball bearing 78 in FIG. 5, i.e., seated between the collimator and the wall 102. X motor assemblies 112 and Y motor assemblies 114, each with associated flexible couplings 116, 118 and lead screws similar to corresponding components shown and described in connection with FIG. 5, also form parts of the cluster 100. Four optical fibers (not shown) are routed, e.g., through passages in the frame wall 102, to connect with the collimators 104, 106, 108, 110.

Figure 8:
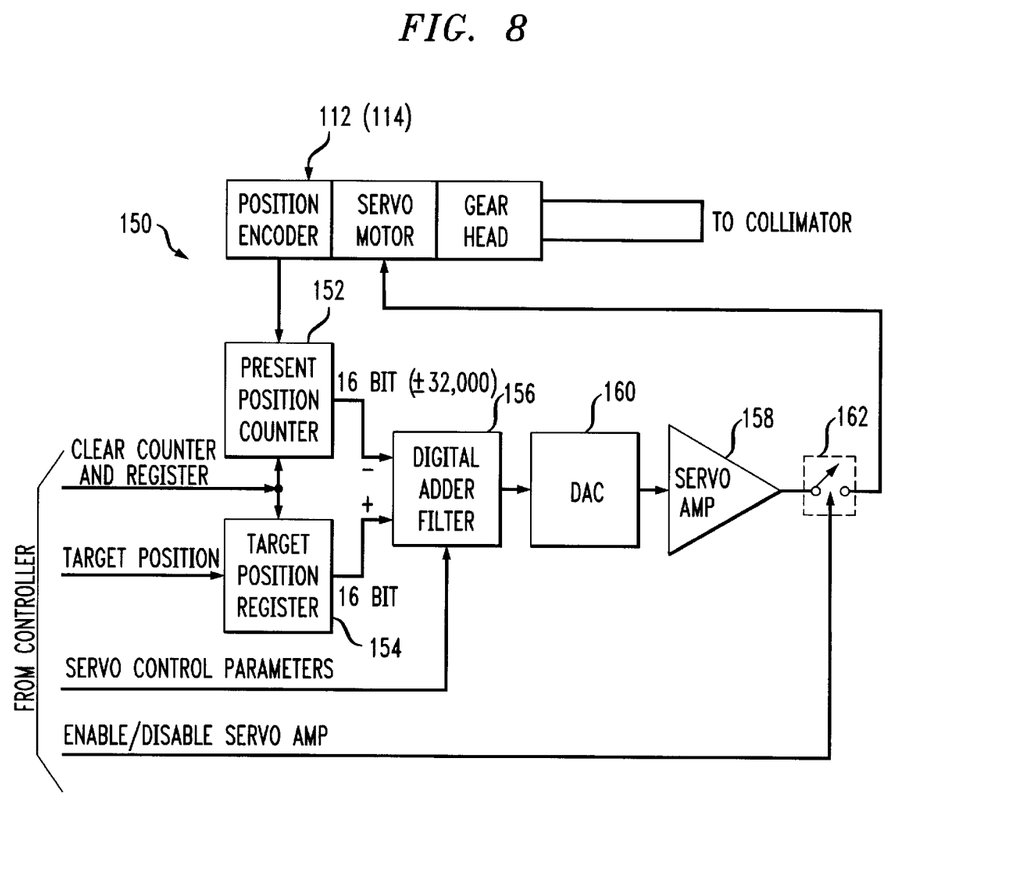
FIG. 8 is a schematic diagram of a position servo control system according to the invention.

FIG. 8 is a schematic block diagram of a position servo control system for each of the X and the Y motor assemblies 112, 114 on the beam deflection cluster 100. For each collimator, two position servo control systems such as shown in FIG. 7 are required to steer the collimator and its associated light beam in the X and the Y directions. Each control system 150 includes a present position counter 152, and a target position register 154. When the system 150 is initially powered-up, the present position counter 152 and the target position register 154 are cleared to all "zeros".

During operation, a difference between outputs from the counter 152 and the register 154 is derived by a digital adder/filter 156, and is applied to a servo amplifier 158 through a digital-to-analog converter (DAC) 160. An output from the servo amplifier 158 drives the assembly motor through a switch 162 which is responsive to an enable/disable signal. The enable/disable signal is produced by a system controller specific details of which can be defined by persons skilled in the art.

A target position signal from the system controller is entered in the target position register 154. If a target position value greater or less than an output of the present position counter 152 is set in the target position register 154, the servo motor assembly operates and its position encoder updates the value of the present position counter 152. When an updated value in the counter 152 equals a target position set in the target position register 154, the servo motor ceases rotation. A clear signal from the system controller clears the position counter 152 and the register 154, and the servo amplifier switch 162 is disabled.

Figure 9:
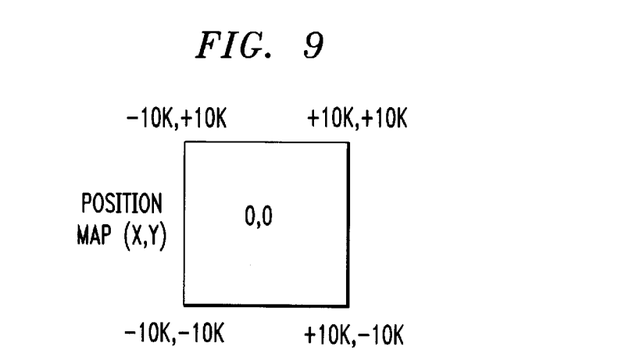
FIG. 9 is a collimator deflection position map for use in the servo control stem of FIG. 8.

FIG. 9 is a position map for each collimator of the beam deflection cluster 100. Preferably, position coordinates (0,0)

define a center or "undeflected" beam position for each collimator. A light beam emitted from the collimator can be steered to a desired X and Y position over a range of +/−10K positions in each of the X and the Y directions. For example, the maximum deflection from center (0,0) may correspond to a beam deflection angle of 8.45 degrees in azimuth (X axis) and in elevation (Y axis) relative to the (0,0) center position.

Figure 10:
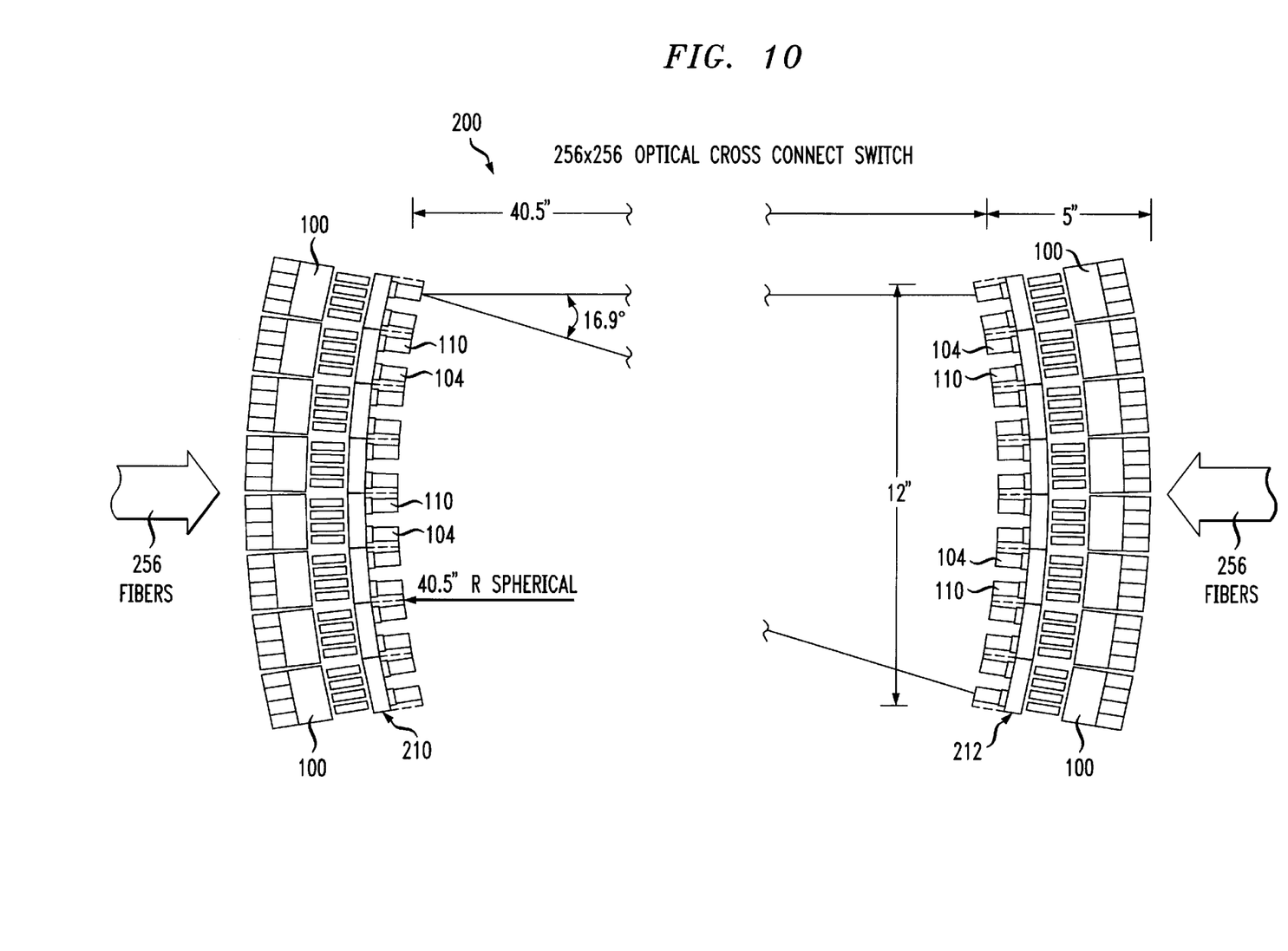
FIG. 10 is a top plan view of an optical cross-connect switch according to he invention.

FIG. 10 is a top plan of view of a 256 collimator×256 collimator, optical cross-connect switch according to the invention. Typical dimensions for the switch 200 are 14" H×14" W×52" L. Cross-connect switching is accomplished by steering one or more collimated light beams produced by collimators at, e.g., the left side in FIG. 10, to impinge axially on lenses of selected collimators at the right side in FIG. 10. Thus, the light beams are steered in a non-blocking manner through free space between the left and the right side collimators.

In the illustrated embodiment, the switch 200 comprises two 8×8 arrays 210, 212 of the beam deflection clusters 100 in FIG. 7, thus forming two 16×16 (256 total) collimator arrays. Preferably, the clusters of each array are joined so that the front faces of their collimators collectively define a spherical surface with a radius of 40.5 inches. The faces of the arrays are spaced apart from one another also by a distance of 40.5 inches, as shown. Accordingly, each cluster array has 256 associated collimators, with the collimators 104, 110 (see FIG. 7) of each cluster 100 visible in the top view of FIG. 10. A bundle of up to 256 optical fibers connect with the left collimator array 210 in FIG. 10, and another bundle of up to 256 optical fibers connect with the right collimator array 212. Preferably, each collimator in one array directs its associated light beam toward a point at the center of the opposite array, when the source collimator is at a center deflection (0,0) position. The distance between the two arrays 210, 212 (e.g., 40.5") is such that when a collimator in one array is fully deflected (e.g., +/−10K, +/−10K), its associated light beam impinges on a collimator at a corner of the facing array.

Figure 11:
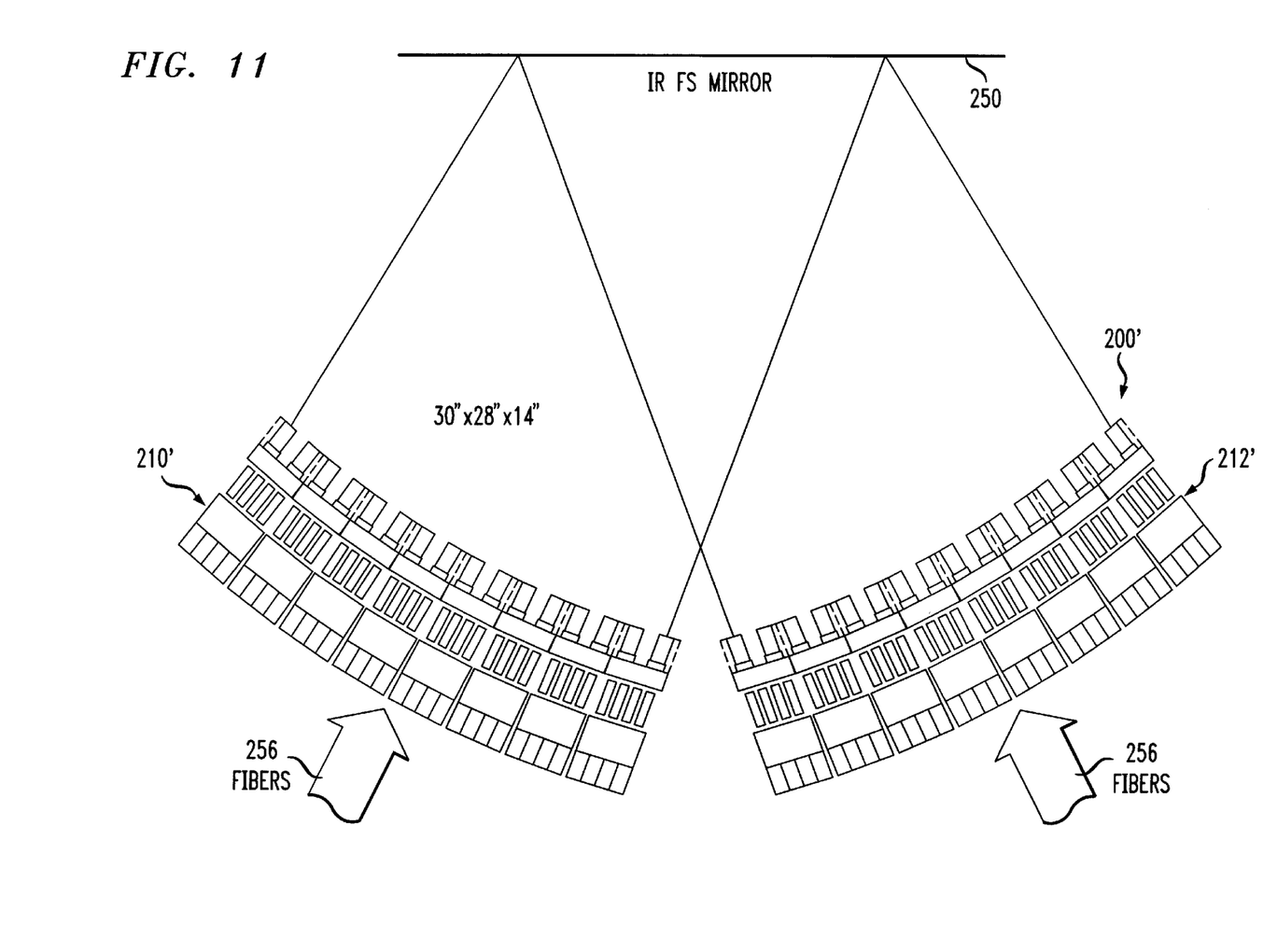
FIG. 11 is a plan view of an alternate arrangement for the cross-connect switch of FIG. 10.

FIG. 11 is a top plan view of an alternate switch configuration 200' for the 256×256 switch 200 in FIG. 10, wherein the paths of optical beams directed between collimators of the arrays 210', 212' are "folded" via an intermediate IR first surface (FS) mirror 250. The dimensions of the switch 200' may be contained within, e.g., 30"×28"×14" using the configuration in FIG. 11.

During a switching operation in which a light beam from a given collimator is steered or "switched" from connection with a collimator of a facing array to connect to a different collimator of the facing array, it is preferable to steer the beam so that it avoids any connection with collimators of the facing array other than the desired one. That is, the X and the Y motor assemblies associated with the given collimator are preferably programmed to deflect the collimator such that its light beam traverses a path between collimators of the facing array, until the beam is at a point next to the desired collimator.

The optical switch 200 (or 200') directs one or more relatively large gaussian optical beams between pairs of collimators having associated single mode optical fibers. Thus, an optical signal carried on a fiber entering a first collimator of either array 210, 212, can be switched into a fiber of a second collimator in the opposite array 212, 210 by steering the beam from the first collimator to impinge on the lens of the second collimator, and aligning the lens axis of the second collimator with that of the first. Each collimator produces a beam having, preferably, a relatively low divergence angle and a large beam diameter, to provide an excellent switch extinction ratio (90 dB) and to allow easy control of the beam. For each collimator, two position servo motors are used to deflect the collimator and its payload beam along the X and the Y axes. For an N×N matrix switch, N collimators are used at each side (port). By aiming the collimators at one another as described herein, it is possible cross-connect all N optical signals without blocking.

The present optical switch affords scalability. That is, the four-collimator beam deflection cluster 100 in FIG. 7 can be used to build from a 4×4 up to, for example, a 4096×4096 matrix optical switch. Insertion loss difference between the 4×4 and the 4096×4096 switch according to the invention, is typically less than ½ dB. Also, with respect to dynamic range, the difference of optical power between an ON and an OFF state of the switch is typically greater than 90 dB. The servo motors used to deflect the collimators are preferably disabled at "idle". Thus, the motors endure a relatively low duty cycle, and any power failure will cause a last set of optical beam routings to be maintained. By using a relatively large beam diameter, the present switch is vibration tolerant.

Figure 12:
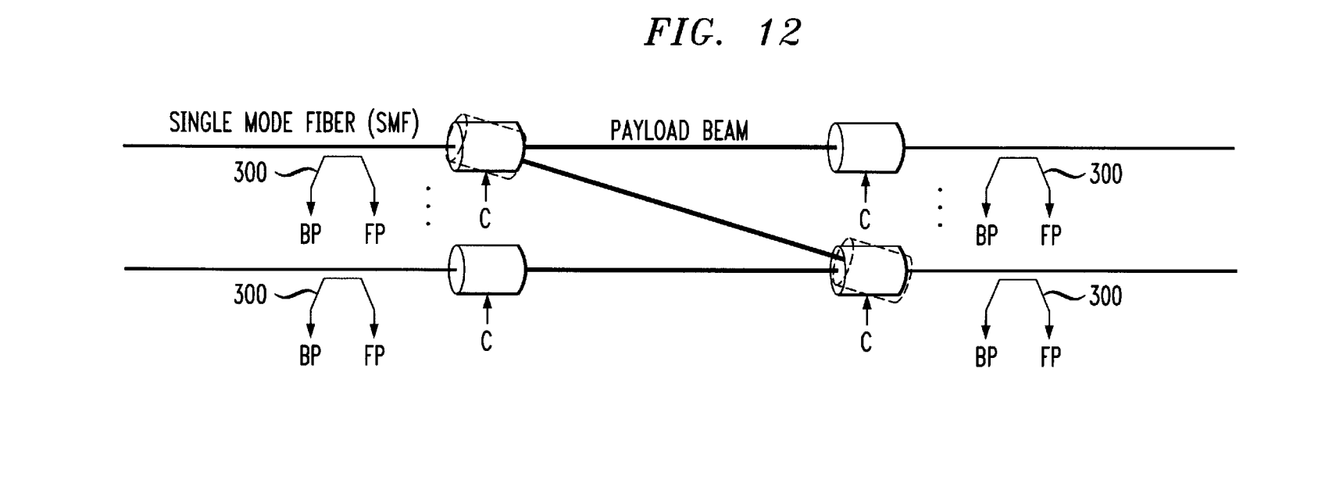
FIGS. 12 and 13 are schematic diagrams of a beam deflection control arrangement for the present optical switch.
Figure 13:
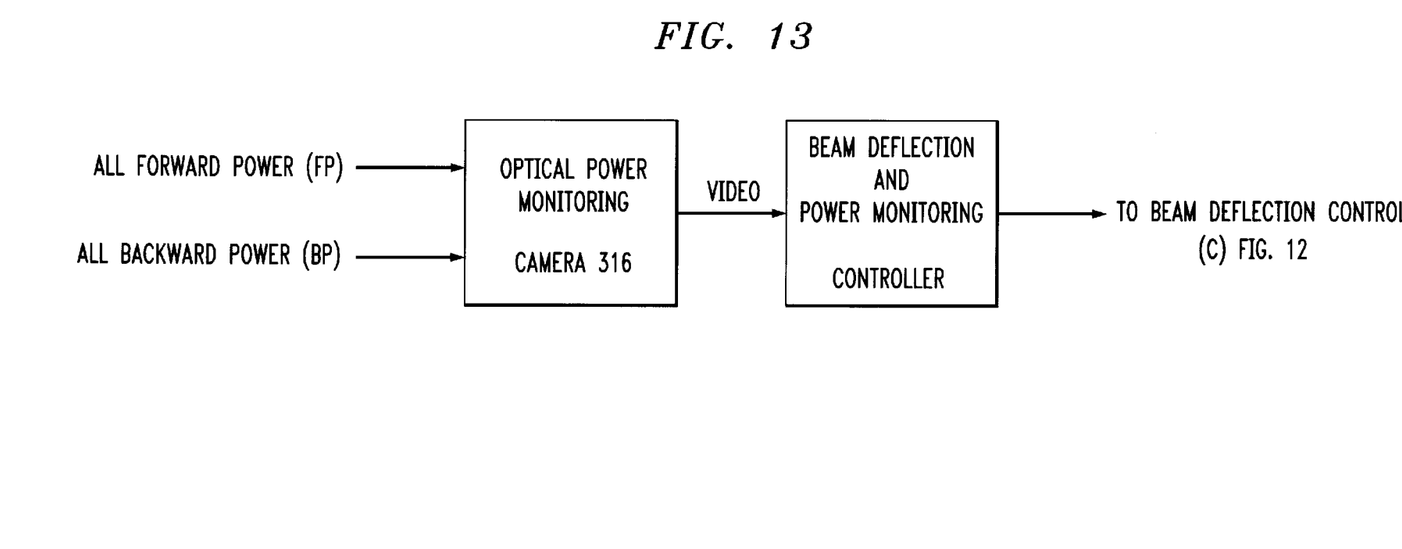

FIGS. 12 and 13 are block diagrams showing a beam deflection control arrangement for the present optical switch. A number of available power monitoring taps 300 are each fused or otherwise joined in a known manner to a corresponding optical fiber, near the point of insertion of the fiber into its associated collimator. As is known in the art, each tap 300 has a backward power (BP) output fiber over which a portion of light which is being reflected opposite the direction of transmission in the fiber, is output. Each tap 300 also has a forward power (FP) output fiber over which a portion of light transmitted by the fiber is output. According to the invention, all of the BP and the FP fibers of the taps 300 are joined in a fiber bundle 310 as in FIG. 14, and light from an output end 312 of the bundle 310 is directed through a lens 314 onto a camera target 316 having a photo-sensitive plate of at least, e.g., 128×128 pixels. The output end 312 is preferably angle polished and anti-reflection (AR) coated.

Figure 14:
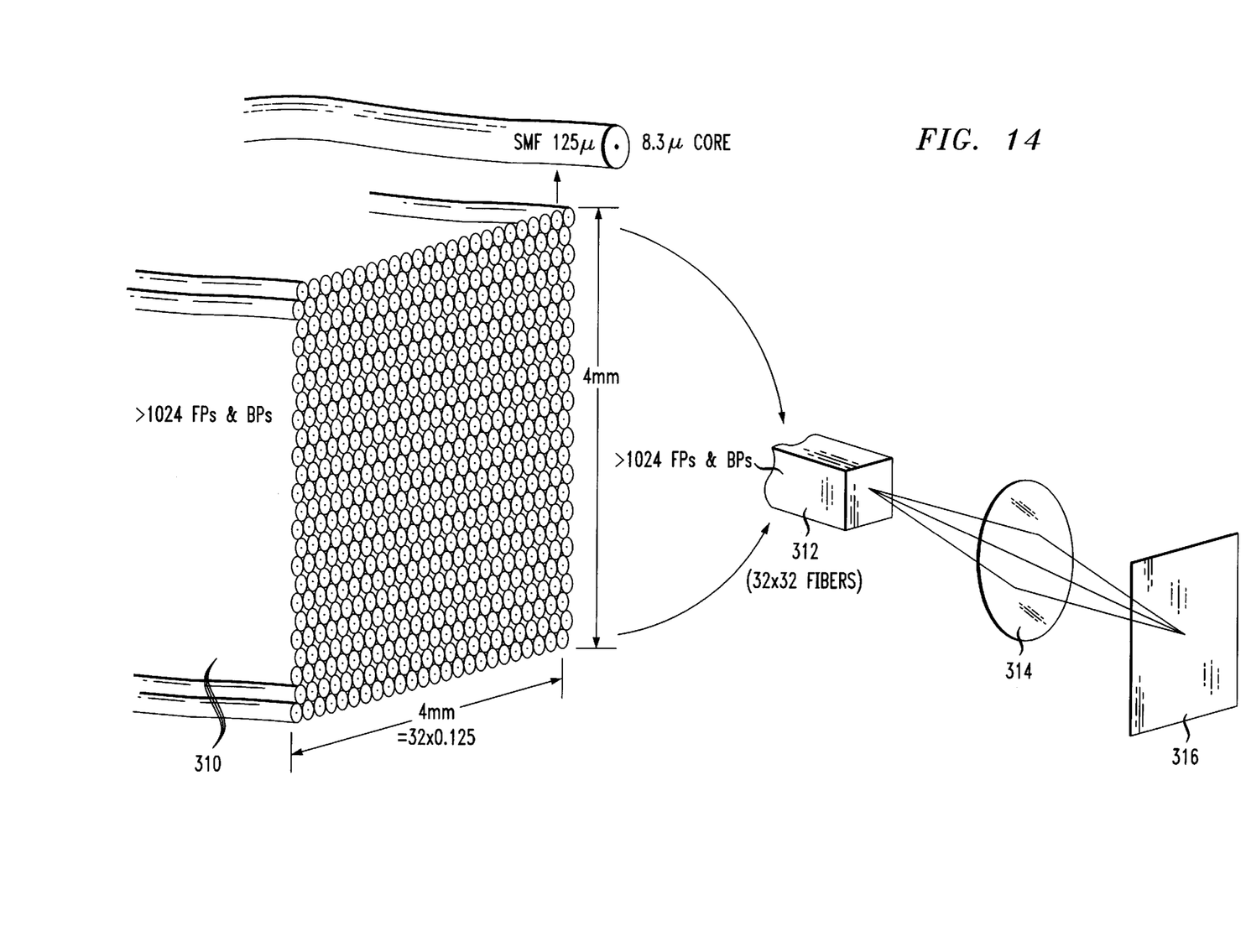
FIG. 14 is a schematic diagram of an optical switch connect power monitoring technique, for use with the beam deflection control arrangement in FIGS. 12 and 13.

When a light beam from a "transmitting" collimator at one side of the switch is connected to a fiber of a "receiving" collimator at the other side of the switch, the two collimators ideally should be axially aligned with one another for maximum light beam power transfer in free space. By monitoring the appropriate output fiber on the power tap 300 joined to the receiving collimator, and displacing the lens axes of the collimators in relatively fine increments until a maximum output is monitored for the fiber via the camera target 316, optimum displacement settings for the established connection can be determined and stored for future use by the controller of the servo control systems for each collimator.

For example, if a collimator at the right side in FIG. 12 is a receiving collimator, a light output on the FP fiber of the associated power tap 300 is monitored via camera target 316 for purposes of securing a maximum or other desired value. If a collimator at the left side in FIG. 12 is a receiving collimator, a light output on the BP fiber of the associated power tap 300 is monitored to secure a maximum or other desired value. Also, by comparing a FP (or BP) fiber output for a transmitting collimator with a FP (or BP) fiber output of a receiving collimator, a measure of the switch insertion loss for a free-space light connection between the two collimators can be determined. A desired insertion loss or optical attenuation value, including a minimum insertion loss, may thus be secured by operation of the controller.

While the foregoing description represents preferred embodiments of the invention, it will be obvious to those skilled in the art that various changes and modifications may be made without departing from the true spirit and scope of the invention pointed out by the following claims.

I claim:

1. A fiber optic light beam collimator, comprising;
   a generally tubular collimator body having a fiber receiving part at one end of the collimator body, and a lens mounting part at an opposite end of said body;
   a lens fixed in said lens mounting part for producing a collimated light beam from light transmitted from an end of an optical fiber when said the fiber is inserted in said fiber receiving part;
   a first motor assembly mounted on a motor frame and having a first positioning element configured to deflect said light beam to a desired position along a first axis in response to operation of the first motor assembly; and
   a second motor assembly mounted on said motor frame and having a second positioning element configured to deflect said light beam to a desired position along a second axis in response to operation of the second motor assembly.

2. A collimator according to claim 1, wherein the fiber receiving part of the collimator body defines a fiber axis inclined with respect to a lens axis of the lens mounting part of the body by a determined amount, so that light transmitted from the end of the optical fiber is in substantial alignment with the lens axis.

3. A collimator according to claim 1, including a bearing seated between the collimator body and the motor frame.

4. A fiber optic beam deflection cluster comprising four light beam collimators according to claim 1, wherein the motor frame is constructed and arranged to support the light beam collimators substantially parallel to one another in a two-by-two array, and including four motor sets wherein each set comprises said first and said second motor assemblies mounted on said motor frame for deflecting corresponding ones of the light beam collimators.

5. A strictly non-blocking fiber optic switch, comprising:
   a first fiber optic beam deflection array, and a second fiber optic beam deflection array supported in confronting relation to the first beam deflection array;
   wherein each of said beam deflection arrays comprises at least one fiber optic beam deflection cluster including four light beam collimators, and each light beam collimator comprises,
     a generally tubular collimator body having a fiber receiving part at one end of the collimator body, and a lens mounting part at an opposite end of said body, and
     a lens fixed in the lens mounting part for producing a collimated light beam from light transmitted from an end of an optical fiber when said fiber is inserted in said fiber receiving part;
   said beam deflection cluster having a motor frame, and four motor sets wherein each motor set comprises,
     a first motor assembly mounted on said motor frame and having a first positioning element configured to displace a corresponding collimator body so that its associated light beam is deflected to a desired position along a first axis in response to operation of the first motor assembly; and
     a second motor assembly mounted on said motor frame and having a second positioning element configured to displace said corresponding collimator body so that said associated light beam is deflected to a desired position along a second axis in response to operation of the second motor assembly;
   wherein a light beam from a first collimator of said first beam deflection array is deflected to connect with a desired second collimator of the second beam deflection array, in response to operation of the motor sets associated with the first and the second collimators.

6. A fiber optic switch according to claim 5, wherein the fiber receiving part of each collimator body defines a fiber axis inclined with respect to a lens axis of the lens mounting part of the body by a determined amount, so that light transmitted from the end of the optical fiber is in substantial alignment with the lens axis.

7. A fiber optic switch according to claim 5, including a bearing seated between each collimator body and an associated motor frame.

8. A fiber optic switch according to claim 5, including an intermediate mirror element arranged to fold paths of optical beams directed between collimators of said first and said second fiber optic beam deflection arrays.

9. A fiber optic switch according to claim 5, wherein the light beam collimators of said first and said second beam deflection arrays are positioned so that front faces of the collimators in each array collectively define a spherical surface.

10. A fiber optic switch according to claim 5, wherein each collimator in one of said arrays directs an associated light beam toward a point at the center of the other array when the collimator is set at a center deflection position.

11. A fiber optic switch according to claim 5, including a beam deflection control arrangement comprising a number of power monitoring taps each coupled to a corresponding optical fiber near a collimator in which the fiber is inserted, each of said taps having forward power (FP) and backward power (BP) output fibers, a camera target responsive to light carried by each of the FP and the BP output fibers, and a controller coupled to the camera target for operating the first and the second motor assemblies associated with a pair of optically connected collimators to align the connected collimators for a desired level of optical power transfer.

12. A fiber optic switch according to claim 11, wherein said controller is configured to align the connected collimators for a desired insertion loss or optical attenuation value.

13. A fiber optic switch according to claim 12, wherein said controller is configured to align the connected collimators for a minimum insertion loss.

* * * * *